United States Patent
Olia et al.

(10) Patent No.: US 9,631,521 B2
(45) Date of Patent: Apr. 25, 2017

(54) METHOD FOR OPERATING A COMBINED-CYCLE POWER PLANT

(71) Applicant: ALSTOM Technology Ltd, Baden (CH)

(72) Inventors: Hamid Olia, Zürich (CH); Jan Schlesier, Wettingen (CH); Michael Breitfeld, Adliswil (CH); Philipp Brunner, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 457 days.

(21) Appl. No.: 14/199,506

(22) Filed: Mar. 6, 2014

(65) Prior Publication Data
US 2014/0250913 A1 Sep. 11, 2014

(30) Foreign Application Priority Data
Mar. 6, 2013 (EP) .................... 13158048

(51) Int. Cl.
*F01K 23/10* (2006.01)
*F01K 13/02* (2006.01)
*F02C 6/18* (2006.01)

(52) U.S. Cl.
CPC ............. *F01K 23/10* (2013.01); *F01K 13/02* (2013.01); *F01K 23/101* (2013.01); *F02C 6/18* (2013.01);
(Continued)

(58) Field of Classification Search
CPC .......... F01K 23/10; F01K 23/02; F01K 13/00; F01K 13/02; F01K 23/101; Y02E 20/16; Y02E 20/36; F02C 6/18
See application file for complete search history.

(56) References Cited

U.S. PATENT DOCUMENTS

| 4,028,884 A | 6/1977 | Martz et al. |
| 4,036,011 A * | 7/1977 | Gupta ................. F01K 9/023 |
| | | 137/599.07 |

(Continued)

FOREIGN PATENT DOCUMENTS

| CN | 1500972 A | 6/2004 |
| CN | 202230373 | 5/2012 |

(Continued)

OTHER PUBLICATIONS

IEEE, vol. 14, issue 10, pp. 36-41, Oct. 1977 by Uram.*
(Continued)

*Primary Examiner* — Brian D Nash
(74) *Attorney, Agent, or Firm* — GE Global Patent Operation; Marc A. Vivenzio

(57) ABSTRACT

Method for operating a combined-cycle power plant is provided. The plant includes at least a gas turbine and at least a steam power generation system. The plant activates at least one electric generator connectable to an electric grid, wherein the gas turbine includes a compressor. The steam power generation system includes a steam turbine, a heat recovery steam generator and a bypass line. The method is such that the gas turbine de-loads to a condition, where the compressor operates at its nominal speed. The method is such that the steam turbine de-loads in coordination with the de-load of the gas turbine, to a condition where the total load exported by the plant to the grid is substantially equal to zero, being both the gas turbine and the steam power generation system connected.

10 Claims, 2 Drawing Sheets

(52) U.S. Cl.
CPC .... *F05D 2220/76* (2013.01); *F05D 2270/061* (2013.01); *Y02E 20/14* (2013.01); *Y02E 20/16* (2013.01)

(56) References Cited

U.S. PATENT DOCUMENTS

| | | | |
|---|---|---|---|
| 4,362,013 | A | 12/1982 | Kuribayashi |
| 5,044,152 | A | 9/1991 | Hoizumi et al. |
| 2005/0268594 | A1 | 12/2005 | Kurihara et al. |
| 2007/0130952 | A1 | 6/2007 | Copen |
| 2009/0126338 | A1 | 5/2009 | Kitaguchi |
| 2011/0068575 | A1* | 3/2011 | Zabtcioglu .............. F01K 17/02 290/2 |
| 2014/0250901 | A1* | 9/2014 | Olia ........................ F01K 13/02 60/773 |

FOREIGN PATENT DOCUMENTS

| | | |
|---|---|---|
| DE | 30 16 777 | 11/1981 |
| DE | 10 2008 029 941 | 5/2009 |
| EP | 0 605 156 | 7/1994 |
| EP | 2 056 421 | 5/2009 |
| EP | 2 423 462 | 2/2012 |
| GB | 2453849 A | 4/2009 |
| JP | S54-001742 | 1/1979 |
| JP | S57-179307 | 11/1982 |
| JP | S57-179308 | 11/1982 |
| JP | S59-65507 | 4/1984 |
| JP | S60-249609 | 12/1985 |
| JP | 2010-007665 | 1/2010 |
| JP | 2012-167571 | 9/2012 |
| RU | 2334112 C2 | 9/2008 |
| SU | 1740709 A1 | 6/1992 |
| WO | 2012/131575 | 10/2012 |

OTHER PUBLICATIONS

Siemens presentation, Highly Flexible Fossil Power Plants as Backbone for Future Generation Portfolio, Mar. 19, 2012, by Vortmeyer.*

English Translation of Chinese Office Action issued in connection with corresponding CN Application No. 201410080078.9 on Jul. 3, 2015.

* cited by examiner

METHOD FOR OPERATING A COMBINED-CYCLE POWER PLANT

CROSS-REFERENCE TO RELATED APPLICATIONS

This application claims priority to European application 13158048.2 filed Mar. 6, 2013, the contents of which are hereby incorporated in its entirety.

TECHNICAL FIELD

The present invention relates to a method for operating at minimum load a combined-cycle power plant, comprising gas and steam turbines, without producing electric power that is supplied to a grid.

BACKGROUND

At present times, the production from renewable energy sources being steadily growing, "conventional" power plants will increasingly be required to take on additional tasks such as to provide complementary electricity production to the grid they are connected to on short notice, particularly in the absence of large-scale energy storage systems, which are still far away from commercialization. Large fluctuations during the day require power generators to react quickly to maintain the balance between demand and production. Under these circumstances, the power plants have to supply power to the grid in a flexible way: for example, when the energy required by the grid is low they must be able to reduce the power supplied to the grid up to zero and when the grid requires power again they must be able to provide it very quickly (in some cases they must be able to provide tens of megawatt in seconds).

In the last ten years, the key area of focus of conventional power sources has been the switch from base load to intermediate load operation, and thus the need for fast load ramps, shorter low-load and start-up times, and grid stabilization. In addition, the demand for ancillary services such as provision of control reserves and frequency support, as well as tertiary control reserves and load-follow operation, has increased significantly. As a result, new operating requirements have emerged, such as two-shift operation, load-follow operation, island operation, black start capability, frequency support and very high start-up and operating reliability, in order to stabilize power grid dynamics and hence ensure secure and economic electricity supply.

As the requirements for load cycling are changing and the expansion of renewables is increasing, "conventional" power plants will have to accommodate to periods in which there is an over- or under-capacity of power. Depending on the country and power grid concerned, various dynamic capabilities are required to ensure security of supply, such as primary control, secondary control, capability for island operation, load rejection, black start capability, grid restoration following blackout, frequency stabilization, etc. Combined-cycle plants (i.e. power plants comprising gas and steam turbines) allow faster load changes within a wider load range, which make these plants more flexible. Furthermore, when considering fast start-ups and efficiency, the combined cycle power plant stands high in comparison with other electricity production methods. Even more, combined-cycle plants offer a significantly higher rate of load change than other conventional power plants thanks to innovative and specifically developed systems.

If, in future, the renewable capacity that is currently planned becomes operational, previously base loaded power plants, such as combined-cycle power plants, will not merely have to be run down to part load, but will have to be completely shut down in many cases in order to avoid significant overcapacities. These combined-cycle power plants will then need to be started up from the shut-down condition as rapidly as possible to cover demand in the event of short term loss of renewable power. The only solution, in the absence of adequate storage systems, is the increased use of conventional plants in so-called "two-shift operation", that is, start-up and shut-down on a daily basis (and sometimes several times per day) in order to compensate for fluctuations in load. Under these operating conditions, it is essential that start-ups are able to take place very rapidly and reliably, which is possible with combined cycle plants, due to the relative simplicity of their fuel and combustion systems.

As it was mentioned, start-up reliability is becoming an increasingly important issue and combined-cycle plants exhibit significant advantages over other conventional technologies in this respect, due to the fact that they have the lowest degree of complexity. Several start-up methods for combined-cycle power plants are known in the state of the art, as per EP 2423462 A2, EP 0605156 A2, CN 202230373 U, for example. Enhanced start-ups are known as per US 2005/0268594 A1, US 2009/0126338 A1 or WO 2012/131575 A1, for instance.

It is also known in the state of the art, as per EP 2 056 421, a method to connect a combined power plant (with gas turbine and steam turbine) to a grid.

As already stated, with the deregulation of the electricity market, high fuel prices and emerging renewable energy, more combined-cycle power plants are operated as peak load power plants, which can therefore adjust the power they supply as quickly as it is needed.

Thus, the power plant manufacturer must design the combined-cycle power plants not only for base-load operation, but also for medium-load or minimum possible load operation, and especially having the increased flexibility that is required for providing the required performance as quickly as possible situations such as the shutdown of the power plant when low energy requirements are required from the power plant or for a quickly start-up for the plant providing the required performance needed.

As any start-up from standstill of the power plant is linked to a certain risk of delay or decreased reliability, the power plant operators prefer not to start the power plant from a complete shutdown operation but from a minimum load operation status. Such an operational strategy would provide the opportunity to be capable of providing a correct schedule of the power plant to meet the requirement of the electrical network, particularly providing reliable start-up within a given time window. However, operating the power plant at the minimum possible load has several problems:

- The de-loading of the power plant to the minimum load operation leads to the over-stressing of the steam turbine materials. Below certain gas turbine operation range, reduced gas turbine exhaust temperature leads to reduction of the Heat Recovery Steam Generator (HRSG) steam temperature, consequently leading to cooling hot steam turbine materials such as the rotor and the admission valves.
- The gas turbine is not capable to provide grid frequency support, for example, primary response. Operation at minimum load does not fulfill the transmission system requirements.

Therefore, there exists the need of the transmission system operator to be capable to use the provided minimum plant power. The plant must be also capable to reduce the load as low as possible. The present invention is oriented towards providing the aforementioned needs.

SUMMARY

The present invention relates to a method for operating at minimum load a combined-cycle power plant, comprising gas and steam turbines, without producing electric power that is supplied to a grid. This minimum load condition is particularly advantageous instead of the shutdown of the plant, for a further loading-up of the power plant departing from this minimum load condition.

The minimum load operation condition corresponds to that condition where all turbines (both gas and steam turbines) of the power plant are in operation (are online) and the load that is produced (that is, the total output load generated by all the turbines in the power plant) does not exceed the house load consumption (that is, does not exceed the load needed for internal consumption of the power plant). Thus the load exported to the grid is zero.

The method of the invention is based on the de-loading of the combined-cycle power plant to the condition of zero load exported to the grid. The gas turbine is de-loaded to the minimum load condition corresponding to that in which its compressor is operating at its nominal speed or to a condition lower than that, in the case where the steam turbines provides also the load necessary for maintaining the compressor in the gas turbine at nominal speed. The steam turbine is also de-loaded in coordination with the de-loading of the gas turbine, that is, in coordination with the load provided by the gas turbine. The minimum load condition of the steam turbine corresponds to that covering the internal auxiliary load demand of the power plant and, if necessary, to an extra load needed for maintaining the gas turbine compressor at its nominal speed.

According to the method of the invention, the de-loading of the gas turbine and the steam turbine is coordinated in such a way that the de-loading of the steam turbine and the reduction of the steam pressure are chosen such that the minimum steam turbine load and the minimum steam pressure are reached prior to the reduction of the steam temperature caused by the reduction of the gas turbine exhaust temperature during the de-loading of the gas turbine. This allows reducing the steam turbine stress to the thermal stress only, as the mechanical stress is reduced to the lowest possible value. In addition, at the minimum load condition, by acting on a steam turbine control valve, the steam turbine is also capable of providing primary frequency support to the power plant.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
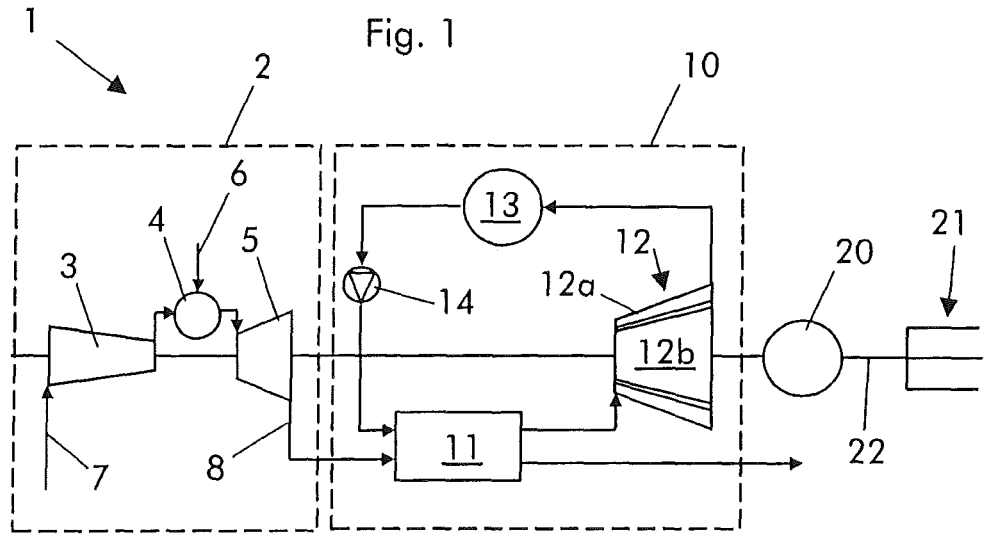
FIG. 1 shows a schematic view of a combined-cycle power plant that can be used to implement the method according to the invention.
Figure 2:
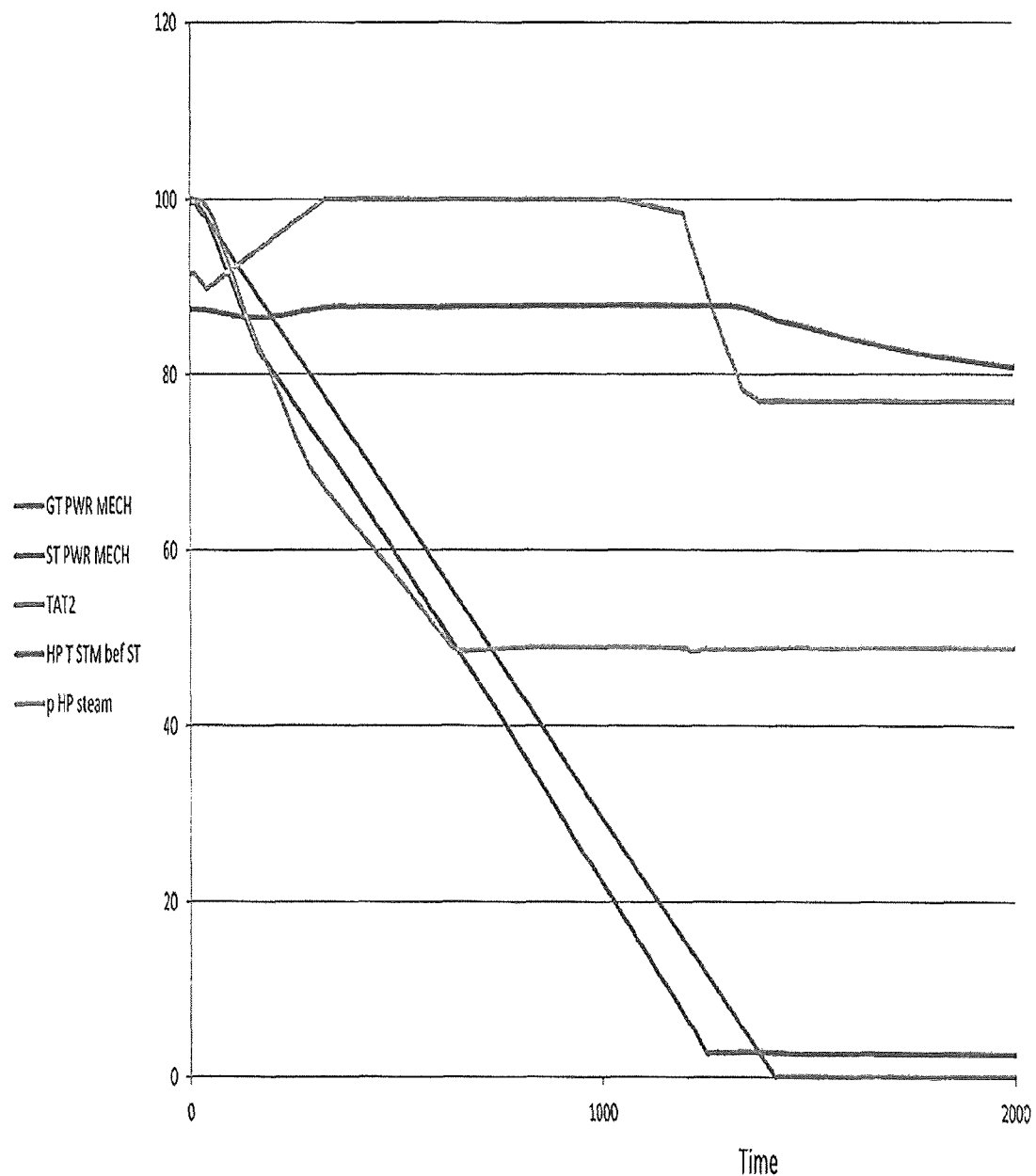
FIG. 2 shows the method for operating a combined-cycle power plant similar to that in FIG. 1 at minimum load, with the method according to the present invention.

The present invention discloses a method for operating a combined-cycle power plant as the one schematically shown in FIG. 1.

The power plant 1 comprises a gas turbine 2 and a steam power generation system 10: the gas turbine 2 and the steam power generation system 10 activate (that is, provide excitation to) an electric generator 20 connectable to an electric grid 21 via line 22.

The gas turbine 2 comprises a compressor 3, a combustion chamber 4 and a turbine 5. The combustion chamber 4 is fed with fuel 6 and oxidizer 7 (usually air compressed in the compressor 3); fuel 6 and oxidizer 7 are combusted to generate hot gases that are expanded in the turbine 5 to obtain mechanical power.

The turbine 5 discharges exhaust flue gases 8 that are then supplied to the steam power generation system 10; the steam power generation system 10 comprises a boiler 11 (also called Heat Recovery Steam Generator, HRSG) that receives the flue gases 8 from the gas turbine 2 and produces steam that is expanded in a steam turbine 12, comprising a stator 12a and a rotor 12b. Typically, as shown in FIG. 1, the steam power generation system 10 also comprises a condenser 13 and a pump 14. The steam produced by the boiler 11 may be dumped into the condenser 13 through a bypass line 40.

Different schemes to the exemplary one shown in FIG. 1 are also possible for implementing the method of the invention.

The present invention relates to a method for operating the combined-cycle power plant 1 at minimum load, where the gas turbine 2 and the steam turbine 12 are connected (are online) and the load that is produced (that is, the total output load generated by the gas turbine 2 and the steam power generation system 10 does not exceed the house load consumption (that is, does not exceed the load needed for internal consumption of the power plant 1), the load exported to the grid 21 being equal to zero or substantially equal to zero.

According to the method of the invention, the de-loading of the gas turbine 2 and of the steam turbine 12 to reach the minimum load operation condition of the combined-cycle power plant 1 is coordinated, and is characterized as follows:
  a) Starting from the plant 1 at base load or at part load condition, the gas turbine 2 and the steam turbine 12 start to de-load.
  b) The steam turbine 12 is de-loaded to the condition which corresponds to the required minimum load for the total exported load to the grid 21 being substantially equal to zero.
  c) The gas turbine 2 is de-loaded with a de-loading gradient which ensures that the steam temperature at the outlet of the Heat Recovery Steam Generator 11 is above the allowable temperature required by the steam turbine 12, before the steam turbine 12 has reached the minimum load condition
  d) With the de-loading of the steam turbine 12, the bypass 40 opens to reduce the steam pressure to a fixed value, preferably between 15% and 100% of the nominal pressure, more preferably between 30% and 50% of the nominal pressure.
  e) The de-loading of the steam turbine 12 and the reduction of the steam pressure by acting on the bypass 40 in the steam power generation system 10 are chosen such that the minimum steam turbine 12 load and the minimum steam pressure are reached prior to the reduction of the steam temperature caused by the reduction of the gas turbine 2 exhaust temperature during the de-loading of the gas turbine 2.

f) The gas turbine 2 stops de-loading as soon as the gas turbine 2 load plus the steam turbine 12 load reach the plant auxiliaries load demand, the load exported to the grid 21 being substantially equal to zero.

In the method of the invention, the power plant 1 can operate at house load condition (under step f) above, the total load exported to the grid 21 being substantially equal to zero) with a connection breaker (not shown) connecting the electric generator 20 to the grid 21 closed, so that the generator 20 is connected to the grid 21 but does not provide any power to it, though the plant 1 can provide load by the steam turbine 12 and the gas turbine 2, if required. Alternatively, the electric generator 20 can also be disconnected to the grid 21, when the cited breaker is open: in this situation, the steam turbine 12 and the gas turbine 2 provide the load necessary for the plant auxiliaries, controlling at the same time the plant frequency.

Although the present invention has been fully described in connection with preferred embodiments, it is evident that modifications may be introduced within the scope thereof, not considering this as limited by these embodiments, but by the contents of the following claims.

The invention claimed is:

1. A method for operating a combined-cycle power plant, the plant comprising at least a gas turbine and at least a steam power generation system, the plant activating at least one electric generator connectable to an electric grid, wherein the gas turbine comprises a compressor and wherein the steam power generation system comprises a steam turbine, a heat recovery steam generator and a bypass line, wherein the gas turbine de-loads to a condition, where the compressor operates at its nominal speed, the method comprising:

de-loading the steam turbine in coordination with the de-loading of the gas turbine to a condition where the total load exported by the plant to the grid is substantially equal to zero, wherein the gas turbine and the steam power generation system are connected; and with the de-loading of the steam turbine, opening the bypass line to reduce the steam pressure to a fixed value relative to the nominal pressure, wherein the de-loading of the steam turbine and the reduction of the steam pressure by acting on the bypass are such that the minimum steam turbine load and the minimum steam pressure are reached prior to the reduction of the steam temperature caused by the reduction of the gas turbine exhaust temperature during the de-loading of the gas turbine.

2. The method of claim 1, wherein the steam turbine de-loads to a condition such that the steam turbine covers the internal auxiliary load demand of the plant and also covers the load necessary for maintaining the compressor operating at its nominal speed.

3. The method according to claim 1, wherein the gas turbine is de-loaded following a gradient such that the steam temperature at the outlet of the heat recovery steam generator is above the allowable temperature required by the steam turbine, before the steam turbine has reached the minimum load condition.

4. The method according to claim 1, wherein the bypass line opens to reduce the steam pressure to a fixed value between 15% and 100% of the nominal pressure.

5. The method according to claim 1, wherein the bypass line opens to reduce the steam pressure to a fixed value between 30% and 50% of the nominal pressure.

6. The method according to claim 1, wherein the generator is connected to the grid.

7. The method according to claim 1, wherein the generator is disconnected from the grid.

8. A method for operating a combined-cycle power plant, the plant comprising at least a gas turbine and at least a steam power generation system, the plant activating at least one electric generator connectable to an electric grid, wherein the gas turbine comprises a compressor and wherein the steam power generation system comprises a steam turbine, a heat recovery steam generator and a bypass line, wherein the gas turbine de-loads to a condition, where the compressor operates at its nominal speed, the method comprising:

de-loading the steam turbine in coordination with the de-loading of the gas turbine to a condition where the total load exported by the plant to the grid is substantially equal to zero, wherein the gas turbine and the steam power generation system are connected, and the steam turbine provides primary frequency support to the plant by acting on a steam turbine control valve.

9. The method according to claim 8, wherein with the de-loading of the steam turbine, the bypass line opens to reduce the steam pressure to a fixed value relative to the nominal pressure.

10. The method of claim 9, wherein the de-loading of the steam turbine and the reduction of the steam pressure by acting on the bypass are such that the minimum steam turbine load and the minimum steam pressure are reached prior to the reduction of the steam temperature caused by the reduction of the gas turbine exhaust temperature during the de-loading of the gas turbine.

* * * * *